United States Patent
Shieh

(10) Patent No.: US 7,596,149 B2
(45) Date of Patent: Sep. 29, 2009

(54) LOW BIT RATE VIDEO TRANSMISSION OVER GSM NETWORK

(75) Inventor: Peter F. Shieh, Foster City, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 841 days.

(21) Appl. No.: 11/009,334

(22) Filed: Dec. 9, 2004

(65) Prior Publication Data

US 2008/0101328 A1    May 1, 2008

(51) Int. Cl.
  *H04N 9/825*  (2006.01)
  *H04J 3/16*   (2006.01)
  *H04B 1/26*   (2006.01)

(52) U.S. Cl. .................. 370/437; 370/477; 386/44; 348/520; 375/240.01

(58) Field of Classification Search .............. 370/435, 370/437, 444, 458, 528, 395.64, 493, 253, 370/468, 395.65, 477, 494; 375/240.24, 375/E7.218, E7.267, 240, 240.01; 348/14.3, 348/E7.084, 14.13, 423.1, 512, 234–238, 348/152, 514–520; 386/E9.018, E9.017, 386/E9.023, E9.024, 44; 704/E19.008; 709/204
See application file for complete search history.

(56) References Cited

U.S. PATENT DOCUMENTS

| 5,121,385 | A | | 6/1992 | Tominaga et al. |
| 5,745,380 | A | | 4/1998 | Sandvoss et al. |
| 5,887,187 | A | * | 3/1999 | Rostoker et al. ............... 712/29 |
| 6,084,911 | A | * | 7/2000 | Ishikawa .................... 375/240 |
| 6,947,447 | B1 | | 9/2005 | Okamura |
| 2003/0149724 | A1 | * | 8/2003 | Chang ........................ 709/204 |
| 2003/0174210 | A1 | * | 9/2003 | Vimpari et al. ............... 348/152 |

FOREIGN PATENT DOCUMENTS

| EP | 0806873 | 11/1997 |
| JP | 10322673 | 12/1998 |
| WO | WO-99/63773 | 12/1999 |

OTHER PUBLICATIONS

European Search Report for Application No. EP-05257098; Dated Apr. 19, 2006; European Patent Office (3 pages).

* cited by examiner

*Primary Examiner*—Afsar M. Qureshi
(74) *Attorney, Agent, or Firm*—Lathrop & Gage LLP

(57) ABSTRACT

A method and system for video data delivery using GSM mobile systems is disclosed. In the absence of audio data, the audio transmission is turned off so that video data can be transmitted using close to the maximum bandwidth on the GSM network.

6 Claims, 1 Drawing Sheet

LOW BIT RATE VIDEO TRANSMISSION OVER GSM NETWORK

TECHNICAL FIELD

The present invention is directed to mobile communications, and more specifically to video streaming data delivery over a GSM network in the context of mobile communications.

BACKGROUND

The Global System for Mobile Communications (GSM) is a world-wide standard for digital wireless mobile telephones. Digital wireless telephone technology, in recent years, has advanced to 3G networks due to consumer demand for video telephony services. For all its popularity, GSM networks are unable to deliver video telephony services due to GSM's characteristic narrow bandwidth at 9.6 kilo bits per sec (kbps). On the other hand, 3G networks can transmit data at a rate of 64 kbps, and thus is more suitable for the transmission of video data.

However, despite the technological advancements in 3G networks, digital wireless telephony services and equipment using the GSM standard currently dominate the world market. For example, as of October 2004, more than 1 billion people use GSM wireless telephones, according to some the GSM association. GSM wireless telephony services and equipment account for approximately 70% of the world market in digital wireless telephony. In contrast, the 3G telephony services and equipment account for less than 9% of the world market.

In view of the foregoing, a manner of transmitting video data in the context of GSM networks is needed in order to capitalize on GSM's world market dominance.

DETAILED DESCRIPTION

Figure 1:
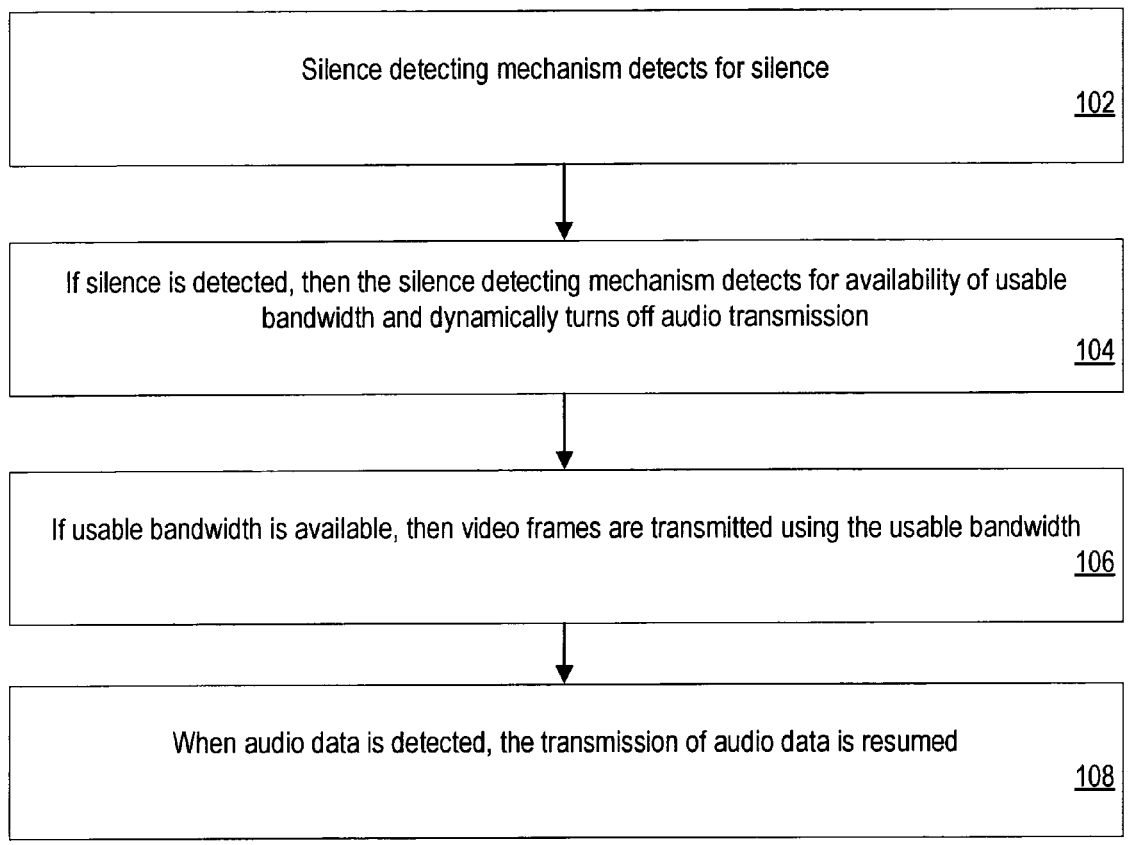
FIG. 1 is a high-level block diagram that illustrates a method of transmitting video data over GSM networks, according to certain embodiments of the invention.

The delivery of video through a GSM network is currently not feasible due to the low bandwidth afforded by GSM networks. When transmitting video frames along with voice data on GSM networks, it is difficult to achieve an acceptable quality in the resulting transmitted data.

According to certain embodiments, when silence (lack of audio data) is detected during a transmission connection for transmitting video frames together with audio data, the audio transmission is turned off in order to use the available bandwidth for transmitting video frames only. When both video data and audio data (such as voice data) are present, both types of data can be transmitted at the same time using the available bandwidth. However, the bit rate for the audio and video data may be adjusted based on the existing bandwidth constraints.

According to certain embodiments, in the absence of audio data, such as silence during a voice conversation, the audio transmission is temporarily turned off. The bandwidth that would have otherwise been relegated for audio transmission is made available for use for transmitting video frames on the GSM network. By using such a method, in combination with conventional video conferencing protocols like H.324 or its variants, 3G/324M, video and audio transmission of acceptable quality over the low bit rate GSM network can be achieved. Further, the transmission rate of video frames can be enhanced by only transmitting the Y luminance value of the video data.

For purposes of explanation, assume that an end-user (caller) wishes to make a video call to another party (callee). The caller begins by establishing a GSM video connection with the callee using a conventional GSM circuit. Once a connection is established (the call is connected), the terminals, such as the now connected telephones of the caller and callee, exchange information on the capabilities of each terminal using conference protocols. An example of a conference protocol is 324M. Assuming that the terminals are capable of establishing GSM video connections, once the connected terminals recognize each other, audio and video conferencing can begin by exchanging audio and video streams between the two terminals. During the video conference, audio data, such as voice data, is given higher transmission priority over video transmission. In other words, video transmission usually occurs using whatever bandwidth is leftover, if any. However, a method as described with reference to FIG. 1 can be used to improve the transmission rate of video frames using the available bandwidth of a GSM network.

FIG. 1 is a high-level block diagram that illustrates a method of transmitting video data over GSM networks, according to certain embodiments of the invention. At block 102, during a video conference telephone call, for example, a silence detecting mechanism automatically detects for silence. At block 104, when silence is detected then, the silence detecting mechanism detects the availability of usable bandwidth and dynamically turns off the audio transmission. At block 106, if available bandwidth is detected, then video streams are transmitted using the available bandwidth. Further, the silence detecting mechanism adjusts the video bit rate and/or the quality of the video to improve viewing of the video. In addition, the transmission rate of video frames can be enhanced by only transmitting the Y luminance value of the video data and/or adjusting the quality and frame rate of the video frames.

The silence detecting mechanism constantly monitors for the absence or existence of audio data as well as any increase or decrease of video data so that audio data, when present, can be transmitted. At block 108, when audio data is detected, the transmission of audio data is resumed. The silence detecting mechanism that constantly monitors for an absence and presence of audio data and the mechanism for turning the audio transmission on and off may be the same mechanism or separate mechanisms and may vary from implementation to implementation.

As previously explained, the silence detecting mechanism for detecting the absence or presence of audio data performs the monitoring on a continuous basis for as long as the telephone call has not been terminated. The actions described with respect to blocks 102, 104 and 106 are repeated when the absence of audio data is again detected. Similarly, the actions of block 108 are repeated whenever audio data is detected.

According to certain embodiments, the silence detecting mechanism that constantly monitors for an absence or presence of audio data, the mechanism for turning the audio transmission on and off, and the mechanism for transmitting video data at maximum GSM bandwidth may be implemented on a single chip.

In certain other embodiments, the silence detecting mechanism that constantly monitors for an absence or presence of audio data, the mechanism for turning the audio transmission on and off, and the mechanism for transmitting video data at maximum GSM bandwidth may be implemented on more than one chip.

In the foregoing specification, embodiments of the invention have been described with reference to numerous specific details that may vary from implementation to implementation. The specification and drawings are, accordingly, to be regarded in an illustrative rather than a restrictive sense.

I claim:

1. A method for video data delivery over a Global System for Mobile Communications (GSM) network, the method comprising:
   during a GSM video connection for transmitting audio data and video data over the GSM network, monitoring if audio data is present;
   if audio data is present, allocating bandwidth of the GSM network to turn on a corresponding audio data transmission with a remaining bandwidth of the GSM network allocated to video data transmission; and
   if audio data is absent, then turning off the corresponding audio transmission and transmitting said video data to occupy a substantially maximum bandwidth of said GSM network; and
   enhancing a transmission rate of video frames by transmitting only luminance value of said video.

2. The method of claim 1, further comprising adjusting at frame rate of the video data being transmitted based on whether the video data is transmitted using said remaining bandwidth or said substantially maximum bandwidth.

3. The method of claim 1, further comprising using a single chip solution for said transmission of said audio and video data over said GSM network.

4. The method of claim 1, further comprising using more than one chip as a solution for said transmission of said audio and video data over said GSM network.

5. The method of claim 1, further comprising adjusting quality of the video data being transmitted based on whether the video data is transmitted using said remaining bandwidth or said substantially maximum bandwidth.

6. A method of making a video call over a low bandwidth Global System for Mobile Communications (GSM) network, comprising:
   establishing a GSM video connection with a callee;
   assigning audio data a higher transmission priority than video data;
   continuously monitoring for presence of audio data;
   if audio data is present, allocating bandwidth of the GSM network to turn on a corresponding audio data transmission with a remaining bandwidth of the GSM network allocated to video data transmission; and
   if audio data is absent, then turning off the corresponding audio transmission and transmitting said video data using a maximum available bandwidth of said GSM network and
   transmitting only luminance values of video data to increase a video frame rate.

* * * * *